United States Patent
Mudulodu

(10) Patent No.: US 10,740,498 B2
(45) Date of Patent: Aug. 11, 2020

(54) SYSTEM AND METHOD FOR SECURE WAKEUP IN A COMMUNICATION SYSTEM

(71) Applicant: Silicon Laboratories Inc., Austin, TX (US)

(72) Inventor: Sriram Mudulodu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 86 days.

(21) Appl. No.: 15/888,415

(22) Filed: Feb. 5, 2018

(65) Prior Publication Data

US 2019/0243991 A1    Aug. 8, 2019

(51) Int. Cl.
| | |
|---|---|
| *G06F 21/81* | (2013.01) |
| *H04W 52/02* | (2009.01) |
| *G06F 1/3287* | (2019.01) |
| *G06F 21/55* | (2013.01) |
| *G06F 9/4401* | (2018.01) |
| *G06F 21/57* | (2013.01) |

(52) U.S. Cl.
CPC ............ *G06F 21/81* (2013.01); *G06F 1/3287* (2013.01); *G06F 9/4418* (2013.01); *G06F 21/554* (2013.01); *G06F 21/57* (2013.01); *H04W 52/0212* (2013.01); *G06F 2221/034* (2013.01)

(58) Field of Classification Search
CPC ........... G06F 21/08; G06F 9/4418; G06F 8/65
See application file for complete search history.

(56) References Cited

U.S. PATENT DOCUMENTS

| | | | | |
|---|---|---|---|---|
| 8,458,483 B1* | 6/2013 | Bailey | ..................... | G06F 21/35 |
| | | | | 713/182 |
| 9,477,292 B1* | 10/2016 | Murali | .................. | G06F 1/3243 |
| 2015/0264124 A1* | 9/2015 | Kuo | ........................ | G06F 1/266 |
| | | | | 709/204 |
| 2017/0039364 A1* | 2/2017 | Sadhasivan | ........... | H04L 9/0819 |

\* cited by examiner

*Primary Examiner* — Dao Q Ho
(74) *Attorney, Agent, or Firm* — File-EE-Patents.com; Jay A. Chesavage

(57) ABSTRACT

The present invention relates to a method and system of secure wakeup in a communication system. The method comprises: transmitting a predetermined wakeup code by a wakeup transmitter of a first node to a wakeup receiver of a second node using a first communication link; establishing a protocol for future wakeup codes periodically between the first node and the second node using a second communication link; wherein the wakeup code is updated based on at least one of: the protocol for future wakeup codes, a first function of time defined by protocol for future wakeup codes, a second function of number of wakeups defined by protocol for future wakeup codes; comparing the wakeup code received by the second node with the wakeup code sent by the first node; and if the wakeup code received by the second node matches a template wakeup code derived from a protocol for future wakeup codes, then the receiver wakes up; otherwise the receiver does not wakeup.

18 Claims, 2 Drawing Sheets

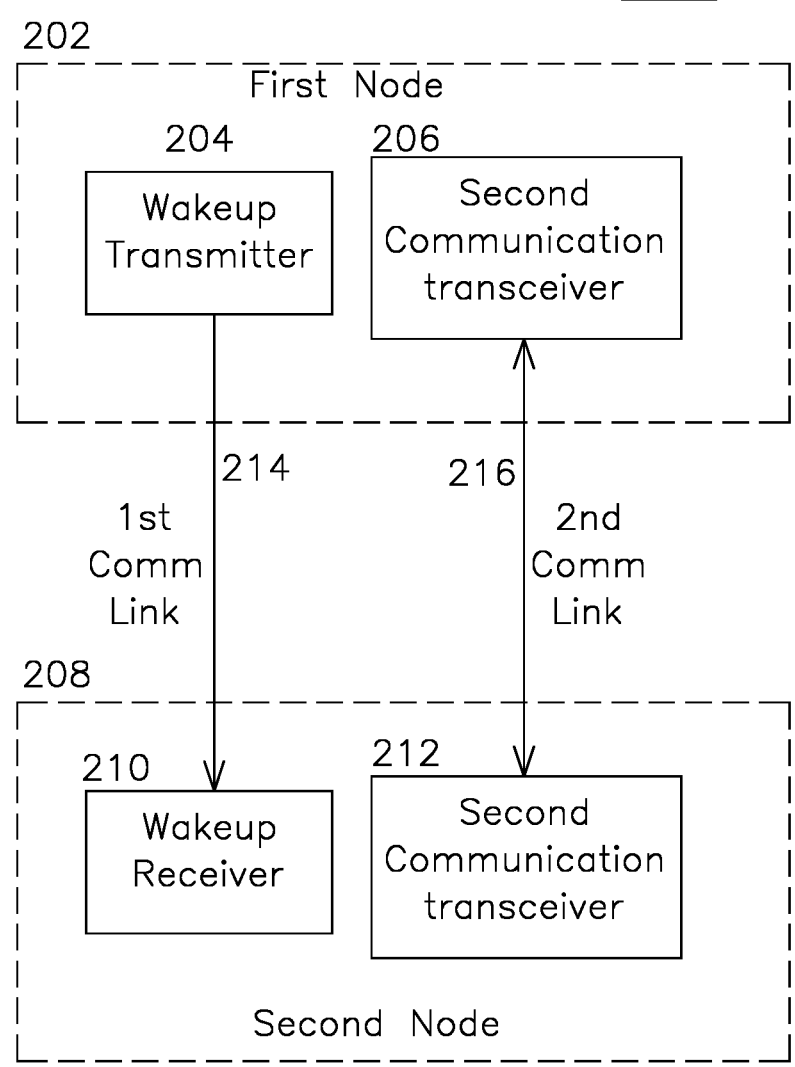

SYSTEM AND METHOD FOR SECURE WAKEUP IN A COMMUNICATION SYSTEM

FIELD OF THE INVENTION

The present invention relates generally to the field of communication. In particular, the invention relates to a system and method for secure wakeup in a communication system.

BACKGROUND OF THE INVENTION

Using a simplified transmission and reception technique to indicate wake up related information to a receiver in order to save power has been of interest for years. A low power energy detection based receiver operates to detect a wakeup code or pattern of bits and wakes up the remainder of the device in case of successful detection of the wakeup code or pattern of bits. Thus, the entire device or chip doesn't need to be awake all the time in order to receive a packet that is transmitted to it. Instead it goes to sleep with only the wake up receiver portion of the chip (which is very low power) running. This portion of the receiver constantly monitors for the presence of its pattern of incoming bits. A transmitter that wishes to communicate with this node first transmits a wake up bit pattern (wakeup code) known to both transmitter and receiver to wake up the receiving node. Subsequently, after wakeup, the transmitter communicates using the normal protocol, for example any of the wireless standards according to IEEE Standard 802.11 WiFi, or Bluetooth. In such a system it is possible that an adversary intent on discharging the battery for the node to frequently transmit a wake up pattern pertaining to a receiver in order to cause unnecessary wake ups and thereby drain its battery (known as a "power draining attack"). It is also possible to achieve this by pre-sharing a wakeup code that is unique to each device and never changes, where the pre-sharing medium is secure or unknown to the adversary. But due to the large number of devices, the number of such wakeup codes would be huge and hence their lengths also have to be high. This causes power consumption to go up which is highly undesirable and hence is not a viable solution.

Hence there is a need for avoiding a power draining attack, and to preserve battery life even in presence of an adversarial attack. In another scenario, it is desired to keep information on which devices are being woken up separate from elements that are not part of the network or other nodes of the same network.

In order to overcome the problems of the existing technology, the present inventor has developed a method and system of secure wakeup in a communication system such that unnecessary wake ups are reduced and the battery draining attack problem is reduced by an adversary device or a third party. In addition, the information of when and which nodes are being awakened remains secure.

OBJECTS OF THE INVENTION

A first object of the invention is to provide a method of secure wakeup in a communication system.

A second object of the invention is to provide a system of secure wakeup in a communication system.

SUMMARY OF THE INVENTION

According to first aspect of the invention, there is provided a method of transmitting a wakeup code from a first node to a second node, the method comprising:

transmitting a predetermined wakeup code according to a sequence of wakeup codes by a wakeup transmitter of a first node to a wakeup receiver of a second node using a first communication link; establishing a protocol for future wakeup codes which periodically change between the first node transmitter and the second node receiver using a second communication link, wherein the second communication link is provided between a second communication transceiver of the first node and a second communication transceiver of the second node;

wherein a predetermined template wakeup code is updated at both the first node transmitter and the second node receiver based on the protocol for future template wakeup codes $C_{wu}[0, 1, 2, \ldots]$ being synchronized between the first node transmitter and the second node receiver (where the wakeup code is used as a template for comparison with the received wakeup code) using any of: a function of time which relies on a time parameter known to both the first node transmitter and the second node receiver such as $C_{wu}=f(time)$, or $C_{wu}$ is a function of number of previous wakeup events $N_{wakeup}$ such as $C_{wu}=f(N_{wakeup})$, or $C_{wu}$ is a value for use in a future wakeup event and shared by the first node transmitter on a previous wakeup. Upon receipt of a wakeup code from a first node transmitter, the second node receiver compares the received code with the template code $C_{wu}$, which may be done using a bit-by-bit cross correlation between each received wakeup code bit and the template code $C_{wu}$ (cross-correlated using a threshold such as more than 90% of the bits must match to cause a wakeup detection event), or a direct value comparison of $C_{wu}$ to the received wakeup code; and if the code sent by the first node matches the template wakeup code known to the second node, then the receiver wakes up for reception and processing of information subsequently sent by the second channel; if the wakeup code sent by the first node does not match with the template code known to the second node, then the receiver does not wake up.

With reference to the first aspect, in a first possible implementation manner of the first aspect, establishing the protocol for future wakeup codes between the second communication transceiver of the first node and the second communication transceiver of the second node is performed securely using the second communication link.

With reference to the first aspect, in a second possible implementation manner of the first aspect, the protocol for future wakeup codes is determined by the first node and the protocol for future wakeup codes is transmitted by the first node to the second node in an encryption means.

With reference to the first aspect, in a third possible implementation manner of the first aspect, the protocol for future wakeup codes is determined by the second node and the protocol for future wakeup codes is transmitted by the second node to the first node in an encryption means.

With reference to the first aspect, in a fourth possible implementation manner of the first aspect, the updated wakeup code is provided to the wakeup transmitter of the first node by the second communication transceiver of the first node.

With reference to the first aspect, in a fifth possible implementation manner of the first aspect, the updated wakeup code is provided to the wakeup receiver of the second node by the second communication transceiver of the second node.

With reference to the first aspect, in a sixth possible implementation manner of the first aspect, the next wakeup code is transmitted by the wakeup transmitter of the first node to the wakeup receiver of the second node using the first communication link as an optionally encrypted value or protocol describing one or more future wakeup codes for use as a subsequent template wakeup code.

With reference to the first aspect, in a seventh possible implementation manner of the first aspect, the wakeup code is generated using a physically unclonable function (PUF).

With reference to the first aspect, in an eight possible implementation manner of the first aspect, the wakeup code is generated using a pseudorandom binary sequence (known as a PRBS in the prior art) generator.

With reference to the first aspect, in a ninth possible implementation manner of the first aspect, the wakeup code is at least one of: a pattern, a binary pattern and a plurality of sequence of numbers.

According to a second aspect of the invention, there is provided a system of transmitting a wakeup code from a first node to a second node, said system comprising: a first node, wherein the first node comprises a wakeup transmitter of the first node and a second communication transceiver of the first node; a second node, wherein the second node comprises a wakeup receiver of the second node and a second communication transceiver of the second node; wherein the wakeup transmitter of the first node is configured to transmit a predetermined wakeup code to the wakeup receiver of the second node using a first communication link; wherein a second communication transceiver of the first node and/or a second communication transceiver of the second node is configured to establish a protocol for future wakeup codes which identifies future template wakeup codes periodically between the first node and the second node using a second communication link; wherein the second communication link is provided between the second communication transceiver of the first node and the second communication transceiver of the second node; wherein the second communication transceiver of the first node and/or the second communication transceiver of the second node is configured to update the template wakeup code based on at least one of: the protocol for future wakeup codes, a first function of time defined by the protocol for future wakeup codes, a second function of number of wakeups defined by the protocol for future wakeup codes; the second node is configured to compare the wakeup code received by the second node with template wakeup code; and the receiver is configured to wake up if the code received by the second node matches the template wakeup code; the receiver is configured to sleep if the wakeup code received by the second node does not match the template wakeup code of the second node.

With reference to the second aspect, in a first possible implementation manner of the second aspect, the second communication link is configured to securely establish the protocol for future wakeup codes between the second communication transceiver of the first node and the second communication transceiver of the second node.

With reference to the second aspect, in a second possible implementation manner of the second aspect, the first node is configured to determine the protocol for future wakeup codes and the first node is configured to transmit the protocol for future wakeup codes to the second node in an encryption means.

With reference to the second aspect, in a third possible implementation manner of the second aspect, the second node is configured to determine the protocol for future wakeup codes and the second node is configured to transmit the protocol for future wakeup codes to the first node in an encryption means.

With reference to the second aspect, in a fourth possible implementation manner of the second aspect, the second communication transceiver of the first node is configured to provide the updated wakeup code to the wakeup transmitter of the first node.

With reference to the second aspect, in a fifth possible implementation manner of the second aspect, the second communication transceiver of the second node is configured to provide a subsequent template wakeup code to the wakeup receiver of the second node.

With reference to the second aspect, in a sixth possible implementation manner of the second aspect, the wakeup transmitter of the first node is configured to transmit the subsequent template wakeup code to the wakeup receiver of the second node using the first communication link.

With reference to the second aspect, in a seventh possible implementation manner of the second aspect, the code is generated using a physically unclonable function (PUF).

With reference to the second aspect, in an eighth possible implementation manner of the second aspect, a pseudorandom binary sequence (PRBS) generator is configured to generate the code.

With reference to the second aspect, in a ninth possible implementation manner of the second aspect, the code is at least one of: a pattern, a binary pattern and a plurality of sequence of numbers.

BRIEF DESCRIPTION OF THE DRAWINGS

Features, aspects, and advantages of the present invention will be better understood when the following detailed description is read with reference to the accompanying drawings in which like characters represent like parts throughout the drawings, wherein:

FIG. 2 illustrates a block diagram of a system of secure wakeup in a communication system, in accordance with an embodiment of the present invention.

Figure 1:
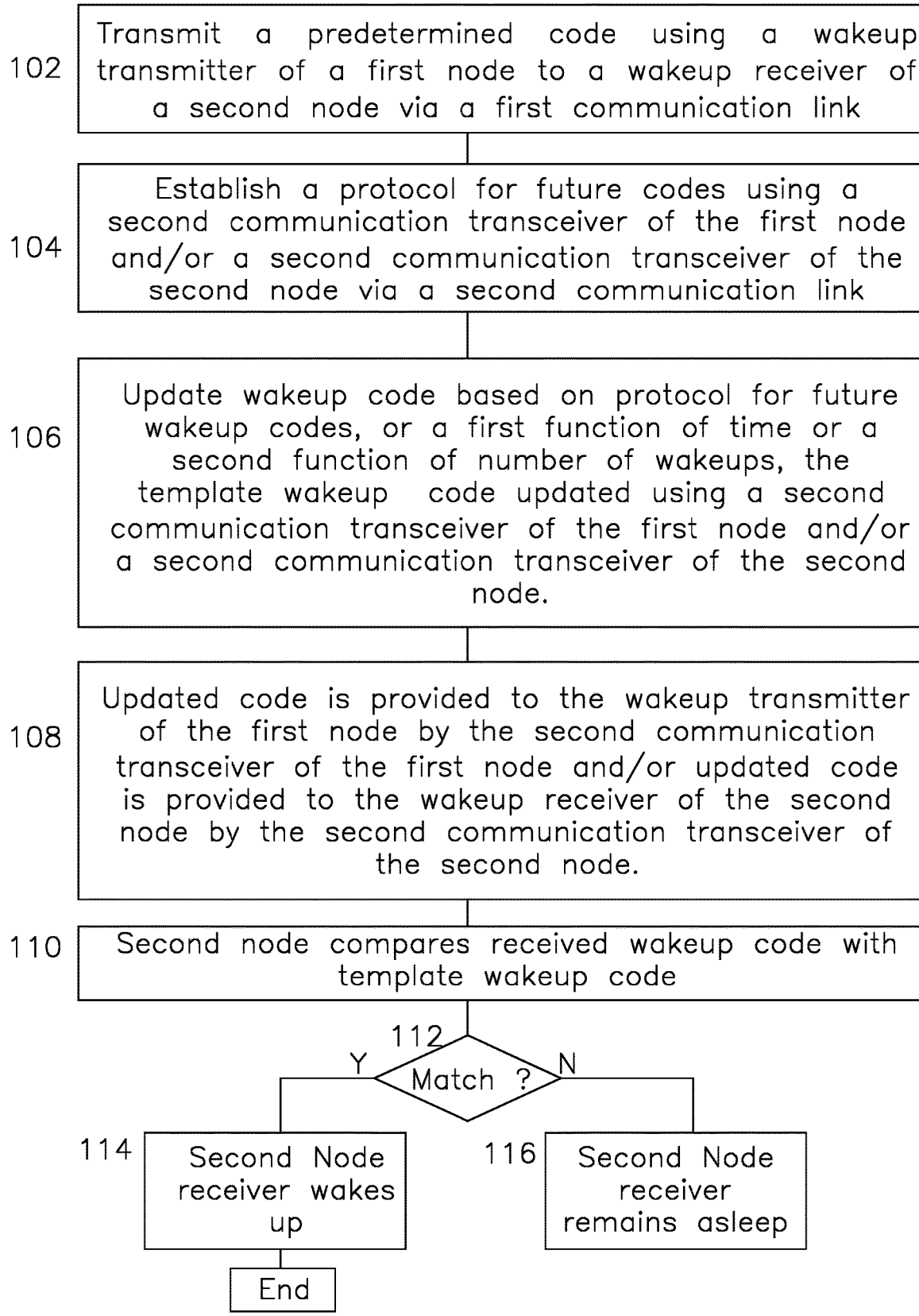
FIG. 1 illustrates a flowchart of a method of secure wakeup in a communication system, in accordance with an embodiment of the present invention.

It should be understood that the drawings are an aid to understanding certain aspects of the present invention and are not to be construed as limiting.

DETAILED DESCRIPTION OF THE INVENTION

While system and method are described herein by way of example and embodiments, those skilled in the art recognize that system and method for a method and system of secure wakeup in a communication system are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

It is understood that the "code" or "wakeup code" as described herein is a reference to the transmitted sequence from a first node which results in a wakeup event upon receipt at a second node upon a match with the template code stored in the second node. Such wakeup event requires communication of the wakeup code to the second node, where it is used as a "template wakeup code", since it is the template wakeup code that is being compared to the received wakeup code transmitted by the first node. In the case where the wakeup code transmitted by the first node is not the same as the template wakeup code known to the second node, the second node does not wake up, and in the case where the transmitted wakeup code is the same as the template wakeup code it is being compared to at the receiving second node, a wakeup occurs.

Disclosed embodiments provide a method and system of secure wakeup in a communication system.

FIG. 1 illustrates a flowchart of a method 100 of secure wakeup in a communication system, in accordance with an embodiment of the present invention. According to the method 100, a wakeup code is transmitted from a first node to a second node in a communication system. In an embodiment, the wakeup code is a pattern, a binary pattern or a sequence of values. The values may be real or complex. For example, a value of the sequence can be −1.2343+j 0.9373 where j denotes sqrt(−1). In an embodiment, the wakeup code is generated using a physically unclonable function (PUF). In another embodiment, the wakeup code is generated using a pseudorandom binary sequence generator. The wakeup code generation may use a protocol for future wakeup codes in combination with a physically unclonable function (PUF).

At step 102, wakeup transmitter 204 of the first node 202 transmits a predetermined wakeup code to a wakeup receiver 210 of the second node 208 using a first communication link 214. In an embodiment, the predetermined wakeup code can be a binary sequence that is programmed to both nodes at time of manufacturer, wherein the wakeup code (of the transmitter and template wakeup code of the receiver) is unique to the two nodes or a larger set of nodes that includes these two nodes. In another embodiment, the wakeup code can be a known fixed wakeup code known to both the nodes or to all other nodes.

At step 104, a protocol for future wakeup codes is established between the first node 202 and the second node 208 using a second communication link 216, wherein the second communication link 216 is provided between a second communication transceiver of the first node 206 and a second communication transceiver of the second node 212. Optionally, the protocol is periodically established. In an embodiment, the second communication link is a WLAN (Wireless Local Area Network) link. In another embodiment the second communication link is a Zigbee link. In yet another embodiment, the second communication link is a Bluetooth link.

In an embodiment, the second communication transceiver of either node is a WLAN transceiver that comprises of a RF (Radio Frequency) module, a baseband module, a MAC module, a processor that runs firmware and/or software.

The protocol for future wakeup codes is established between the second communication transceiver of FIG. 2 showing the first node 206 and the second communication transceiver of the second node 212 is securely performed using the second communication link 216. In an embodiment, the protocol for future wakeup codes is determined by the first node 202 and the protocol for future wakeup codes is transmitted by the first node 202 to the second node 208 in an encryption means. In an embodiment, the encryption means is an Advanced Encryption Standard (AES) encrypted link using a pre-shared key common to both nodes. In another embodiment, the protocol for future wakeup codes is determined by the second node 208 and the protocol for future wakeup codes is transmitted by the second node 208 to the first node 202 in the encryption means.

Returning to FIG. 1, at step 106, the wakeup code is updated based on at least one of: the protocol for future wakeup codes, a first function of time defined by the protocol for future wakeup codes, a second function of number of wakeups defined by the protocol for future wakeup codes.

In an embodiment, the wakeup code is a series of pseudorandom binary sequences generated by a linear feedback shift register (LFSR). In an embodiment, the LFSR may be an MLSR (Maximal Sequence Shift Register). In an embodiment, where the wakeup code is generated in this manner, the protocol for future wakeup codes may be the communicated as the coefficients of an associated PRBS generator polynomial. In one example of the protocol for future wakeup codes, the PRBS coefficients may be exchanged between the two nodes, such that the two nodes have a common wakeup code (for respective use as transmit wakeup code sequence and receive template wakeup code) that changes over time. In an embodiment, the PRBS coefficient exchange happens upon every wake up when the second communication link is used for other purpose, or it is optionally also used in the end for this purpose before the second node goes to sleep. In another embodiment, the wakeup code exchange is done upon the earliest wake up after a specified elapsed time. In an embodiment, the specified elapsed time is one hour. Since this exchange occurs over an encrypted link, an adversary device or third party device cannot determine the changed wakeup code. Thus, it cannot transmit the wakeup code intended for the second node in order to conduct a battery drain attack. Likewise, a third party cannot determine, based on the wakeup code it sees transmitted through the medium, which two nodes communicate or which node is being woken up. In the absence of such a scheme, it is possible for an adversary to drain the battery of second node or for a third party to know which nodes are being woken up and when.

In an embodiment, the protocol for future wakeup codes defines a function of time wherein the time measured in milliseconds is synchronized periodically between the two nodes using the second communication link. Let T be the time in milliseconds. In an embodiment, the seed of the LFSR used to generate the wakeup code is derived as XOR(T_binary, C_binary) mod S, where C_binary form the protocol for future wakeup codes, T_binary is the binary representation of T and S is another predetermined parameter that is dependent on the order of the generator polynomial. T_binary itself may be [T mod (T_max)], where T_max is a predetermined parameter. An example of T_max is 511. In another embodiment, the wakeup code is determined by taking an inverse Fourier transform of the output of the LFSR.

In another embodiment of the invention, the seed of the LFSR used to generate the wakeup code is derived as XOR (N_binary, C_binary) mod S, where N_binary is the binary representation of the wake up count, N which is counted starting from the first wake up event. In an embodiment, N_binary=N mod (N_max), where N_max is a predetermined parameter. An example of N_max=255. In an embodiment, the second function is a look up table of G number of generator polynomials, where the index into this table is determined by (p mod G) where p denotes the number of wakeups. The generator polynomial determined thus is used to generate the wakeup code. In an embodiment, the value of G is 20. In an embodiment, p can take values from 0 to 19 thereafter it is understood to wrap around. In another embodiment, p is represented by a 16 bit unsigned binary counter which automatically wraps around to 0 after reaching the maximum value.

In various embodiments of the invention, the second node has a physically unclonable function support (PUF) wherein the protocol for future wakeup codes is used in conjunction with the PUF to together uniquely determine the wakeup code. The wakeup code changes periodically due to the change in protocol for future wakeup codes established over a second communications link that is secure, whereby a third listening node or device cannot detect when or which nodes are being woken up. In an embodiment, the wakeup code is determined as an exclusive or (XOR) of the binary output of the PUF and the wakeup code determined from the protocol for future wakeup codes as already described above in the absence of PUF. If the lengths of the two differ, one is simply repeated cyclically.

At step 108, the updated wakeup code is provided to the wakeup transmitter 204 of the first node 202 by the second communication transceiver of the first node 206. In an embodiment, the updated wakeup code is provided to the wakeup receiver 210 of the second node 208 by the second communication transceiver of the second node 212. In an embodiment of the invention, the second communication transceiver interfaces with the wakeup receiver to write the updated wakeup code to the corresponding register definition of the wakeup receiver. In an embodiment, the updated wakeup code is used as a next wakeup code to be transmitted by the wakeup transmitter 204 of the first node 202 to the wakeup receiver 210 of the second node 208 using the first communication link 214.

Step 110 is matching or comparing the wakeup code received by the second node 208 with the template wakeup code derived from the protocol for future wakeup codes sent by the first node 202. At step 112, it is determined whether the received wakeup code matches the template wakeup code or not. At step 114, if the wakeup code received by the second node 208 matches the second node template wakeup code, then the receiver wakes up. At step 116, if the wakeup code sent by the first node 202 does not match with the wakeup code received by the second node 208, then the receiver does not wakeup and continues to sleep.

In an embodiment, the matching or comparing the wakeup code is done by the wake up receiver 210 of the second node 208 by correlating with the known wakeup code and declaring a match if it exceeds a threshold where the threshold is a design parameter. In an embodiment, the threshold is set relative to the measured energy as 3 dB below it. In another embodiment, the matching or comparing the wakeup code is done by comparing the correlation with the expected wakeup code to that of another random code of equal length. If the ratio of these two correlations exceeds 0.25*(length of the code), a successful match is declared. In an embodiment, the length of the wakeup code is 255.

FIG. 2 illustrates a block diagram of a system of secure wakeup in a communication system, in accordance with an embodiment of the present invention. The system 200 comprises a first node 202, wherein the first node 202 comprises a wakeup transmitter 204 of the first node 202 and a second communication transceiver of the first node 206; a second node 208, wherein the second node 208 comprises a wakeup receiver 210 of the second node 208 and a second communication transceiver 212 of the second node 208; a first communication link 214 and a second communication link 216.

The system 200 is adapted to perform the method 100 of transmitting the wakeup code from the first node to the second node. In an embodiment, the wakeup code is a pattern, such as a binary pattern, integer pattern, real number pattern, complex number pattern, or a sequence of values. The values may be real or complex. For example, a value of the sequence can be −1.2343+j 0.9373 where j denotes sqrt(−1) of an analytic value sequence. In an embodiment, the wakeup code is generated using a physically unclonable function (PUF). In another embodiment, a pseudorandom binary sequence generator is configured to generate the wakeup code. The wakeup code generation uses a protocol for future wakeup codes and a physically unclonable function (PUF).

The wakeup transmitter 204 of the first node 202 is configured to transmit a predetermined wakeup code to the wakeup receiver 210 of the second node 208 using the first communication link 214. In an embodiment, the predetermined wakeup code can be a binary sequence that is programmed to both nodes 202 and 208 prior to deployment, wherein the wakeup code is unique to the two nodes or a larger set of nodes that includes these two nodes. In another embodiment, the wakeup code can be a known fixed wakeup code known to both the nodes or to all other nodes. In an embodiment, the first communication link 214 is a WLAN (Wireless Local Area Network) link. In another embodiment the first communication link 214 is a Zigbee link. In yet another embodiment, the first communication link 214 is a Bluetooth link.

The second communication transceiver 206 of the first node 202 and/or the second communication transceiver 212 of the second node 208 is configured to establish a protocol for future wakeup codes periodically between the first node 202 and the second node 208 using the second communication link 216; wherein the second communication link 216 is provided between the second communication transceiver 206 of the first node 202 and the second communication transceiver 212 of the second node 208.

In an embodiment, the second communication link 216 is a WLAN (Wireless Local Area Network) link. In another embodiment the second communication link 216 is a Zigbee link. In yet another embodiment, the second communication link 216 is a Bluetooth link. In an embodiment, the second communication transceiver 206 or 212 of either node is a WLAN transceiver that comprises of a RF (Radio Frequency) module, a baseband module, a MAC module, a processor that runs firmware and/or software.

The second communication link 216 is configured to perform securely establishing the protocol for future wakeup codes between the second communication transceiver 206 of the first node 202 and the second communication transceiver 212 of the second node 208. In an embodiment, the first node 202 is configured to determine the protocol for future wakeup codes and the first node 202 is configured to transmit the protocol for future wakeup codes to the second node 208 in an encryption means. In an embodiment, the encryption means is an AES encrypted link using pre-shared key. In another embodiment, the second node 208 is configured to determine the protocol for future wakeup codes and the second node 208 is configured to transmit the protocol for future wakeup codes to the first node 202 in the encryption means.

In an embodiment, the wakeup code is a pseudorandom binary sequence wakeup code generated by a linear feedback shift register (LFSR). In an embodiment, the LFSR may be an MLSR (Maximal Sequence Shift Register). In an embodiment, where the wakeup code is generated in this manner, the protocol for future wakeup codes provides for transmitting only the coefficients of a PRBS generator polynomial. By periodically exchanging this between the two nodes, both have a common wakeup code that changes over time. In an embodiment, the exchange happens upon every wake up when the second communication link is used for other purpose, it is also used in the end for this purpose before the second node goes to sleep. In another embodiment, the exchange is done upon the earliest wake up after a specified elapsed time. In an embodiment, the specified elapsed time is one hour. Since this exchange occurs over an encrypted link, an adversary device or third-party device cannot determine the changed wakeup code.

The second communication transceiver 206 of the first node 202 and/or the second communication transceiver 212 of the second node 208 is configured to update the wakeup code based on at least one of: the protocol for future wakeup codes, a first function of time defined by the protocol for future wakeup codes, a second function of number of wakeups defined by the protocol for future wakeup codes.

In an embodiment, the protocol for future wakeup codes defines a function of time wherein the time measured in milliseconds is synchronized periodically between the two nodes using the second communication link. Let T be the time in milliseconds. In an embodiment, the seed of the LFSR used to generate the wakeup code is derived as XOR(T_binary, C_binary) mod S, where C_binary form the wakeup code defining parameter set, T_binary is the binary representation of T and S is another predetermined parameter that is dependent on the order of the generator polynomial. T_binary itself may be [T mod (T_max)], where T_max is a predetermined parameter. An example of T_max is 511. In another embodiment, the wakeup code is determined by taking an inverse Fourier transform of the output of the LFSR.

In another embodiment of the invention, the seed of the LFSR used to generate the wakeup code is derived as XOR (N_binary, C_binary) mod S, where N_binary is the binary representation of the wake up count, N which is counted starting from the first wake up event. In an embodiment, N_binary=N mod (N_max), where N_max is a predetermined parameter. An example of N_max=255. In an embodiment, the second function is a look up table of G number of generator polynomials, where the index into this table is determined by (p mod G) where p denotes the number of wakeups. The generator polynomial determined thus is used to generate the wakeup code. In an embodiment, the value of G is 20. In an embodiment, p can take values from 0 to 19 whereafter it is understood to wrap around. In another embodiment, p is represented by a 16 bit unsigned binary counter which automatically wraps around to 0 after reaching the maximum value.

In various embodiments of the invention, the second node has a physically unclonable function support (PUF) wherein the protocol for future wakeup codes is used in conjunction with the PUF to together uniquely determine the wakeup code. The wakeup code changes periodically due to the change in protocol for future wakeup codes established over a second communications link that is secure, whereby a third node or device cannot detect when or which nodes are being woken up. In an embodiment, the wakeup code is determined as an xor of the binary output of the PUF and the wakeup code determined from the protocol for future wakeup codes as already described above in the absence of PUF. If the lengths of the two differ, one is simply repeated cyclically.

The second communication transceiver 206 of the first node 202 is configured to provide the updated wakeup code to the wakeup transmitter 204 of the first node 202. In an embodiment, the second communication transceiver 212 of the second node 208 is configured to provide the updated wakeup code to the wakeup receiver 210 of the second node 208. In an embodiment of the invention, the second communication transceiver 212 interfaces with the wakeup receiver 210 to write the updated wakeup code to the corresponding register definition of the wakeup receiver 210. In an embodiment, the wakeup transmitter 204 of the first node 202 is configured to transmit the updated wakeup code as a next wakeup code to the wakeup receiver 210 of the second node 208 using the first communication link 214.

The second node 208 is configured to compare the wakeup code received by the second node 208 with the wakeup code sent by the first node 202; and the receiver is configured to wake up if the wakeup code received by the second node 208 matches the second node template wakeup code. The receiver is configured to sleep if the wakeup code sent by the first node 202 does not match with the wakeup code received by the second node 208.

In an embodiment, matching or comparing the wakeup code is done by the wake up receiver 206 of the second node 208 by correlating the received wakeup code with the known template wakeup code and declaring a match if the correlation result exceeds a threshold where the threshold is a design parameter. In an embodiment, the threshold is set relative to the measured energy as 3 dB below it. In another embodiment, the matching or comparing the wakeup code is done by comparing the cross-correlation result between the received wakeup code with the template wakeup code to the cross-correlation result of the received wakeup code with a different random template wakeup code of equal length. If the ratio of these two correlations exceeds 0.25*(length of the wakeup code), a successful match is declared. In an embodiment, the length of the wakeup code is 255. Other techniques or variants of the technique are already used in existing art.

Having described and illustrated the principles of the invention with reference to described embodiments, it will be recognized that the described embodiments may be modified in arrangement and detail without departing from such principles.

In view of the many possible embodiments to which the principles of the invention may be applied, we claim the invention as all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

The detailed description is presented to enable a person of ordinary skill in the art to make and use the invention and is provided in the context of the requirement for obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A method of wakeup communication from a first node to a second node, said method comprising:
   transmitting a predetermined wakeup code by a transmitter of the first node to a receiver of the second node using a first wireless communication link;
   establishing a protocol for future wakeup codes between the first node and the second node using a second wireless communication link which is distinct from the first wireless communication link, wherein the second wireless communication link is provided between a transceiver of the first node and a transceiver of the second node, the protocol including establishing future wakeup codes for use by the first node and the second node;
   wherein the future wakeup codes are derived from at least one of:
      a particular sequence of future wakeup codes;
      a sequence of future wakeup codes derived from a time of transmission or time of reception of a wakeup code;
      a sequence of future wakeup codes which depends on a number of previously transmitted or previously received wakeup codes;
   the receiver of the second node comparing a wakeup code received by the receiver of the second node with a corresponding one of the future wakeup codes;
   the second node transceiver waking up upon receipt by the second node receiver of a wakeup code which matches a corresponding one of the future wakeup codes;
   the second node transceiver taking no action upon receipt by the second node receiver of a wakeup code which does not match the corresponding one of the future wakeup codes;
   wherein the protocol for future wakeup codes generates a next wakeup code to be transmitted by the transmitter of the first node to the receiver of the second node using the first wireless communication link.

2. The method of claim 1, wherein the protocol for future wakeup codes is performed securely using the transceiver of the second wireless communication link.

3. The method of claim 1, wherein the future wakeup codes are determined by the first node and the future wakeup codes are transmitted by the first node to the second node in an encryption means.

4. The method of claim 1, wherein the future wakeup codes are determined by the second node and the future wakeup codes are transmitted by the second node to the first node in an encryption means.

5. The method of claim 1, wherein the corresponding one of the future wakeup codes is provided to the transmitter of the first node by the transceiver of the first node using the second wireless communication link.

6. The method of claim 1, wherein the corresponding one of the future wakeup codes is provided to the receiver of the second node by the transceiver of the second node.

7. The method of claim 1, wherein the protocol for future wakeup codes is generated using a physically unclonable function (PUF).

8. The method of claim 1, wherein the corresponding one of the future wakeup codes is generated using a pseudorandom binary sequence generator.

9. The method of claim 1, wherein the corresponding one of the future wakeup codes is at least one of: a pattern, a binary pattern and a plurality of sequence of values.

10. A system comprising:
    a first node comprising a transmitter coupled to a transceiver;
    a second node comprising a receiver coupled to a transceiver;
    wherein the transmitter of the first node is configured to transmit a predetermined wakeup code to the receiver of the second node using a first wireless communication link;
    wherein the transceiver of the first node and/or the transceiver of the second node is configured to establish a protocol for future wakeup codes between the transmitter of the first node and the receiver of the second node using a second wireless communication link which is separate from the first wireless communication link;
    wherein the transceiver of the first node and/or the transceiver of the second node is configured to establish the predetermined wakeup code based on at least one of:
       the protocol for future wakeup codes,
       a first function of time defined by the protocol for future wakeup codes,
       a second function of number of wakeups defined by the protocol for future wakeup codes;
    the second node configured to compare a wakeup code received by the receiver of the second node with a wakeup code derived from the protocol for future wakeup codes and assert a match output according to the result of the comparison;
    the transceiver of the second node waking up when the match output is asserted;

the transceiver of the second node not waking up when the match output is not asserted;

wherein the protocol for future wakeup codes generates a next wakeup code to be transmitted by the transmitter of the first node to the receiver of the second node using the first wireless communication link.

11. The system of claim 10, wherein the second wireless communication link is configured to establish the protocol for future wakeup codes.

12. The system of claim 10, wherein the first node is configured to determine the protocol for future wakeup codes and the first node is configured to transmit the protocol for future wakeup codes to the second node in an encryption means.

13. The system of claim 10, wherein the second node is configured to determine the protocol for future wakeup codes and the second node is configured to transmit the protocol for future wakeup codes to the first node in an encryption means.

14. The system of claim 10, wherein the transceiver of the first node is configured to provide the predetermined wakeup code to the transmitter of the first node.

15. The system of claim 10, wherein the transceiver of the second node is configured to provide the predetermined wakeup code to the receiver of the second node.

16. The system of claim 10, wherein the predetermined wakeup code is generated using a physically unclonable function (PUF).

17. The system of claim 10, wherein the predetermined wakeup code is generated by a pseudorandom binary sequence.

18. The system of claim 10, wherein the predetermined wakeup code is at least one of: a pattern, a binary pattern and a plurality of sequence of values.

* * * * *